United States Patent
Wang et al.

(10) Patent No.: US 6,486,276 B1
(45) Date of Patent: Nov. 26, 2002

(54) PROCESS TO PREPARE ETHYLENE PROPYLENE ELASTOMER

(75) Inventors: Qinyan Wang, Calgary (CA); Stephen John Brown, Calgary (CA)

(73) Assignee: Nova Chemicals (International) S.A. (CH)

( * ) Notice: Subject to any disclaimer, the term of this patent is extended or adjusted under 35 U.S.C. 154(b) by 0 days.

(21) Appl. No.: 09/862,189

(22) Filed: May 21, 2001

(30) Foreign Application Priority Data

Jun. 8, 2000 (CA) ............................................. 2311068

(51) Int. Cl.$^7$ .............................. C08F 4/16; C08F 4/44; C08F 210/06
(52) U.S. Cl. ...................... 526/133; 526/134; 526/160; 526/161; 526/943; 526/348; 502/152; 502/155; 502/167
(58) Field of Search ................................. 526/133, 134, 526/160, 161, 943, 170, 172, 348; 556/32, 53; 502/155, 167, 152

(56) References Cited

U.S. PATENT DOCUMENTS

| | | | |
|---|---|---|---|
| 4,871,705 A | 10/1989 | Hoel | 502/117 |
| 5,055,438 A * | 10/1991 | Canich | 502/117 |
| 5,132,380 A | 7/1992 | Stevens et al. | 526/126 |
| 5,198,401 A | 3/1993 | Turner et al. | 502/155 |
| 5,229,478 A | 7/1993 | Floyd et al. | 526/160 |
| 5,491,207 A | 2/1996 | Hoel | 526/129 |
| 5,589,555 A | 12/1996 | Zboril et al. | 526/64 |
| 5,696,213 A | 12/1997 | Schiffino et al. | 526/158 |

FOREIGN PATENT DOCUMENTS

EP  0 374 695 A2  6/1990

OTHER PUBLICATIONS

Jordan et al., Early Metal Carborane Chemistry, Organometallics 1995, 14 2993–3001.*

* cited by examiner

Primary Examiner—David W. Wu
Assistant Examiner—R. Harlan
(74) Attorney, Agent, or Firm—Kenneth H. Johnson

(57) ABSTRACT

A solution polymerization process for the preparation of elastomeric ethylene propylene (diene) elastomers is characterized by the use of a) an unbridged catalyst having a cyclopentadienyl ligand and a monosubstituted nitrogen ligand; and b) a boron activator. High molecular weight elastomers may be inexpensively prepared by the process of this invention. The elastomers are suitable for the manufacture of rubber sheets or membranes and automotive parts such as seals, belts, hoses and tire sidewalls.

11 Claims, No Drawings

PROCESS TO PREPARE ETHYLENE PROPYLENE ELASTOMER

FIELD OF THE INVENTION

This invention relates to a solution polymerization process for the preparation of ethylene propylene elastomers using a comparatively inexpensive single site catalyst system. The catalyst of the present process is an unbridged Group 4 organometallic complex having a cyclopentadienyl ligand and a monosubstituted nitrogen ligand. A boron activator is also required.

BACKGROUND OF THE INVENTION

Ethylene propylene (EP) elastomers are widely available items of commerce which are prepared by copolymerizing ethylene, propylene and (optimally) a small amount of a diene monomer. Copolymers which contain at least 20 weight % of randomly distributed propylene units are substantially less crystalline than typical thermoplastic polyethylene or polypropylene homopolymers. A combination of low crystallinity and high molecular weight generally provides elastomeric properties in these polymers. These elastomers are used in many applications such as membranes (for roofing or for pond liners); blending components for the preparation of "toughed" thermoplastics (such as "toughened" polypropylene and toughened nylon) and, in particular, automotive parts. Examples of automotive parts which are made from ethylene propylene elastomers include belts, seals, hoses and tire sidewalls.

Ethylene propylene elastomers may also include a small amount of a diene. This leaves residual unsaturation in the elastomer which may be usefully employed to prepare "vulcanized" or "cured" compounds. Such elastomers are typically referred to as "EPDM".

EP and/or EPDM elastomers generally require a weight average molecular weight ("Mw") of at least 60,000 in order to provide sufficient tensile strength for use in automotive applications. These elastomers may be produced in slurry and solution polymerization processes.

Slurry polymerization processes are particularly suitable for preparing extremely high molecular weight ethylene propylene (diene) elastomers.

Solution polymerization processes are somewhat less suitable for the preparation of high molecular weight ethylene propylene (diene) elastomers because the high solution viscosity of high molecular weight elastomers makes such solutions difficult to handle. This problem may be mitigated by increasing the solution temperature. However, the use of higher polymerization temperatures generally increases the rate of chain termination reactions and thereby lowers the molecular weight of the polymer.

Conventional EP and EPDM elastomers are typically prepared with a Ziegler catalyst system comprising a Group 4 or 5 metal and an alkyl aluminum (halide) cocatalyst. Vanadium is the generally preferred metal because it provides elastomers having high molecular weight. Exemplary vanadium compounds include vanadium halides (especially vanadium chloride), vanadium alkoxides and vanadium oxy halides (such as $VOCl_3$). These vanadium compounds are inexpensive but are not particularly active.

More recently, the use of "single site catalysts" such as metallocene catalysts has been proposed for the preparation of EP or EPDM elastomers. These catalysts are generally more expensive than the simple vanadium components described above. In particular, high catalyst costs are incurred due to the cost of synthesizing the organometallic catalyst complexes and/or when large amounts of alumoxane cocatalysts are used. Accordingly, high polymerization activity (as well as the capability to produce high molecular weight EP and EPDM polymers) is required if these new catalysts are to provide economically viable alternatives to the vanadium compounds.

Bridged metallocene catalysts (i.e. catalysts having a bridging group which is bonded to two cyclopentadienyl or indenyl or fluorenyl ligands) have been proposed for the preparation of EP elastomers. See for example, U.S. Pat. No. 4,871,705 (Hoel; to Exxon), U.S. Pat. No. 5,229,478 (Floyld et al.; to Exxon) and U.S. Pat. No. 5,491,207 (Hoel; to Exxon).

The use of bridged metallocene is potentially desirable because such catalysts may be more stable (i.e. less prone to decomposition) than unbridged catalysts under ethylene propylene polymerization conditions. However, bridged metallocenes are comparatively difficult and expensive to synthesize. Moreover, such catalysts can lead to the formation of isotactic polypropylene sequences in ethylene propylene polymers (as disclosed in European Patent Application (EPA) 374,695; Davis et al; to Polysar Ltd.) which is not desirable for products that are intended for use as elastomers.

Similarly, U.S. Pat. No. 5,696,213 (Schiffino et al.; to Exxon) teaches the preparation of EP and EPDM in a solution process using a cyclic monocyclopentadienyl Group 4 metallocene catalyst (i.e. a catalyst having a bridged (or "cyclic") ligand in which the cyclopentadienyl group forms part of the "bridge" (or "cyclic") ligand with another atom—such as a group 15 heteroatom being bonded both to the cyclopentadienyl ligand and the Group 4 metal so as to form the rest of the cyclic ligand. This patent also teaches the use of a bridged bis indenyl hafnium catalyst.

SUMMARY OF THE INVENTION

A process for the preparation of an elastomeric ethylene-propylene polymer wherein said process is characterized by being undertaken under solution polymerization conditions in the presence of a catalyst system which comprises:

1) an unbridged catalyst having a single cyclopentadienyl ligand and a monosubstituted nitrogen ligand; and
2) a boron activator;
   wherein said catalyst is defined by the formula:

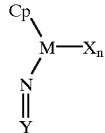

wherein Y is selected from the group consisting of:
  ai) a phosphorus substituent defined by the formula:

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

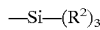
—Si—$(R^2)_3$ wherein each $R^2$ is independently selected from the group consisting of hydrogen, a $C_{1-8}$ alkyl or alkoxy radical, $C_{6-10}$ aryl or aryloxy radicals, and a germanyl radical of the formula:

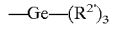
—Ge—$(R^{2'})_3$ wherein $R^{2'}$ is independently selected from the group consisting of hydrogen, a $C_{1-8}$ alkyl or alkoxy radical, $C_{6-10}$ aryl or aryloxy radicals, and a germanyl radical; and aii) a substituent defined by the formula:

wherein each of Sub$^1$ and Sub$^2$ is independently selected from the group consisting of hydrocarbyls having from 1 to 20 carbon atoms; silyl groups, amido groups and phosphido groups.

Cp is a ligand selected from the group consisting of cyclopentadienyl, substituted cyclopentadienyl, indenyl, substituted indenyl, fluorenyl and substituted fluorenyl;

X is an activatable ligand and n is 1 or 2, depending upon the valence of M and the valence of X; and M is a group 4 metal selected from the group consisting of titanium, hafnium and zirconium.

Preferred elastomeric polymers have a weight average molecular weight of at least 60,000 and a propylene content of at least 20 weight %.

As noted above, the process of this invention must employ a boron activator. As described later and illustrated in the examples, it is particularly preferred to use a small amount of the activator (especially an equimolar amount of the catalyst and activator). This can provide a cost advantage in comparison to the more conventional use of large molar excesses of alumoxane cocatalyst. In addition, whilst not wishing to be bound by theory, it is believed that large molar excesses of alumoxane may lead to the degradation of the catalysts of this invention under the conditions required for the solution polymerization of ethylene propylene elastomers. (More particularly, it is postulated that large molar excesses of alumoxane may lead to undesirable interactions or reactions with the metal-nitrogen bond of the catalysts of this invention, such as the formation of bridging groups and/or cleavage of the metal-nitrogen bond.)

DETAILED DESCRIPTION OF PREFERRED EMBODIMENTS

Part 1. Description of Catalysts

The catalyst used in the process of this invention is a Group 4 organometallic complex which is characterized by having a cyclopentadienyl ligand, a monosubstituted nitrogen ligand (which is a phosphinimine ligand or a ketimide ligand) and at least one activatable ligand. Each of these ligands is described in detail below.

1.A Phosphinimine Ligand

The catalyst preferably contains a phosphinimine ligand which is covalently bonded to the metal. This ligand is defined by the formula:

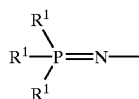

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

—Si—$(R^2)_3$ wherein each $R^2$ is independently selected from the group consisting of hydrogen, a $C_{1-8}$ alkyl or alkoxy radical, $C_{6-10}$ aryl or aryloxy radicals, and a germanyl radical of the formula:

—Ge—$(R^{2'})_3$ wherein $R^{2'}$ is independently selected from the group consisting of hydrogen, a $C_{1-8}$ alkyl or alkoxy radical, $C_{6-10}$ aryl or aryloxy radicals, and a germanyl radical.

This ligand contains a "monosubstituted nitrogen atom" in the sense that there is only one phosphorus atom (doubly) bonded to the nitrogen atom.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

1.B Ketimide Ligands

As used herein, the term "ketimide ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b and c are illustrated below:

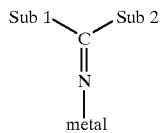

This ligand also contains a monosubstituted nitrogen atom in the sense that only one carbon atom is (doubly) bonded to the nitrogen atom.

The substituents "Sub 1" and "Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

1.C Cyclopentadienyl Ligands

As used herein, the term cyclopentadienyl ligand is meant to broadly convey its conventional meaning, namely a ligand having a five carbon ring which is bonded to the metal via eta-5 bonding. Thus, the term "cyclopentadienyl" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)$_3$ wherein each R is independently selected from the group consisting of hydrogen, a $C_{1-8}$ alkyl or alkoxy radical $C_{6-10}$ aryl or aryloxy radicals; germanyl radicals of the formula Ge—(R)$_3$ wherein R is as defined directly above.

1.D Activatable Ligand

The catalyst used in the process of this invention must also contain an activatable ligand. The term "activatable ligand" refers to a ligand which may be activated by the boron activator (or a combination of the boron activator with a small amount of alumoxane) to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The preferred catalyst metals are Group 4 metals in their highest oxidation state (i.e. 4$^+$) and the preferred activatable ligands are monoanionic (such as a hydrocarbyl group—especially methyl). Thus, the preferred catalyst contain a phosphinimine ligand, a cyclopentadienyl ligand and two chloride (or methyl) ligands bonded to the Group 4 metal. In some instances, the metal of the catalyst component may not be in the highest oxidation state. For example, a titanium (III) component would contain only one activatable ligand.

1.E Summary Description of Preferred Catalyst

Both of the "phosphinimine" and "ketimide" ligands have been discovered to provide high molecular weight EP and/or EPDM elastomers under solution polymerization conditions with surprisingly good activity when activated with a boron activator. The "phosphinimine" catalysts are preferred because of their particularly good activity and for reasons which will be apparent upon consideration of the data in the Examples. More particularly, the most preferred catalysts are Group 4 organometallic complex in its highest oxidation state having a phosphinimine ligand, a cyclopentadienyl-type ligand and two activatable ligands. These requirements may be concisely described using the following formula for the preferred catalyst:

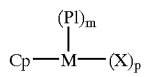

wherein: (a) M is a metal selected from Ti, Hf and Zr; (b) Pl is a phosphinimine ligand defined by the formula:

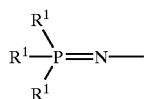

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

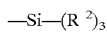

wherein each $R^{2'}$ is independently selected from the group consisting of hydrogen, a $C_{1-8}$ alkyl or alkoxy radical, $C_{6-10}$ aryl or aryloxy radicals, and a germanyl radical of the formula:

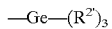

wherein $R^2$ is independently selected from the group consisting of hydrogen, a $C_{1-8}$ alkyl or alkoxy radical, $C_{6-10}$ aryl or aryloxy radicals, and a germanyl radical; (c) Cp is a ligand selected from the group consisting of cyclopentadienyl, substituted cyclopentadienyl, indenyl, substituted indenyl, fluorenyl, substituted fluorenyl; and (d) X is an activatable ligand, and wherein: m is 1, n is 1 and p is 2.

2.A Description of Boron Activators

The boron activators used in this invention, also referred to those skilled in the art as, "ionic activators" and are well known for use with metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion coordinating anion permits olefin polymerization to proceed at the cationic catalyst center (presumably because the non-coordinating anion is sufficiently labile to be displaced by monomer which coordinates to the catalyst). Preferred boron activators are described in (i)–(iii) below:

(i) compounds of the formula $[R^5]^+[B(R^7)_4]^-$ wherein B is a boron atom, $R^5$ is a aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—($R^9$)$_3$ wherein each $R^9$ is independently selected from the group consisting of a hydrogen atom and a $C_{1-4}$ alkyl radical; and (ii) compounds of the formula $[(R^8)_t ZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula B(R⁷)₃ wherein R⁷ is as defined above. [Note: B(R⁷)₃ is not an ionic compound. Whilst not wishing to be bound by theory, it is believed that compounds of the formula B(R⁷)₃ abstract an activatable ligand (L) from the catalyst species, thus forming a non coordinating anion of the formula [B(R⁷)₃L]⁻ wherein L is an activatable ligand as previously described herein.

In the above compounds preferably R⁷ is a pentafluorophenyl radical, R⁵ is a triphenylmethyl cation, Z is a nitrogen atom and R8 is a $C_{1-4}$ alkyl radical or R⁸ taken together with the nitrogen atom forms an anilinium radical which is substituted by two $C_{14}$ alkyl radicals.

Whilst not wishing to be bound by theory, it is postulated that the boron activator may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of boron activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene(diazonium)tetrakispentafluorophenyl borate,
tropillium phenyltrispentafluorophenyl borate,
triphenylmethylium phenyltrispentafluorophenyl borate,
benzene(diazonium)phenyltrispentafluorophenyl borate,
tropillium tetrakis(2,3,5,6-tetrafluorophenyl)borate,
triphenylmethylium tetrakis(2,3,5,6-tetrafluorophenyl) borate,
benzene(diazonium)tetrakis(3,4,5-trifluorophenyl)borate,
tropillium tetrakis(3,4,5-trifluorophenyl)borate,
benzene(diazonium)tetrakis(3,4,5-trifluorophenyl)borate,
tropillium tetrakis(1,2,2-trifluoroethenyl)borate,
triphenylmethylium tetrakis(1,2,2-trifluoroethenyl)borate,
benzene(diazonium)tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl) borate, and
benzene(diazonium)tetrakis(2,3,4,5-tetrafluorophenyl) borate.

Commercially available boron activators include: N,N-dimethylaniliniumtetrakispentafluorophenyl borate, triphenylmethylium tetrakispentafluorophenyl borate, and trispentafluorophenyl borane.

The boron activator is preferably added to the reactor on a roughly equimolar basis to the transition metal of the catalyst. Mole ratios of from 0.5/1 to 2/1 may be used, with 1/1 to 1.2/1 being especially preferred. It would be permissible (but wasteful and expensive) to use large molar excesses of the boron activator.

2.B Other (Optional) Components: Alumoxanes and Poison Scavenaers

Alumoxanes may not be used as the sole cocatalyst in the process of this invention (because of the comparatively poor activity under ethylene propylene solution polymerization conditions, as shown in the Examples). However, alumoxanes may be used as a (second) cocatalyst and/or as a poison scavenger.

The alumoxane may be of the formula:

$$(R^4)_2AlO(R^4AlO)_mAl(R^4)_2$$

wherein each R⁴ is independently selected from the group consisting of $C_{1-20}$ hydrocarbyl radicals and m is from 0 to 50, preferably R⁴ is a $C_{1-4}$ alkyl radical and m is from 5 to 30. Methylalumoxane (or "MAO") in which each R is methyl is the preferred alumoxane.

Alumoxanes are also readily available articles of commerce generally as a solution in a hydrocarbon solvent.

The alumoxane, when employed, is preferably added at an aluminum to transition metal (in the catalyst) mole ratio of from 20:1 to 1000:1. Preferred ratios are from 5:1 to 250:1.

Furthermore, whilst not wishing to be bound by any theory, it is believed that the metal-nitrogen bond of the catalysts of this invention may be susceptible to degradation/cleavage by acidic poisons under the polymerization conditions of this invention. These poisons may be present in the solvent, monomers or even in the alumoxane solution (such as residual alkyl aluminum). Accordingly, it is also preferred to use a minor amount of a base as a scavenger for these poisons. It is particularly preferred that this base be sterically bulky. Sterically bulky amines and/or sterically bulky alcohols are preferred.

The data provided in the Examples show a surprising activity increase when an alumoxane is used in combination with the boron activator (in comparison to the boron above, and in particular, in comparison to the poor activity obtained when the alumoxane is used above). However, it has not been conclusively established whether this desirable result is caused by the catalyst-alumoxane "activating" influence, or from the mitigation of the deleterious effects of catalyst poisons or some combination thereof.

Description of Solution Polymerization Process

Solution processes for the polymerization of ethylene propylene elastomers are well known in the art. These processes are conducted in the presence of an inert hydrocarbon solvent such as a $C_{5-12}$ hydrocarbon which may be unsubstituted or substituted by a $C_{1-4}$ alkyl group such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The process of this invention is undertaken at a temperature of 10° C. to 150° C., such as 20° C. As previously noted, the use of a high polymerization temperature will generally reduce the solution viscosity (which is desirable) but also reduce molecular weight (which may be undesirable). The preferred polymerization temperature is less than 100° C., where a surprising combination of excellent polymerization activity and excellent molecular weight may be obtained.

The present invention is a process which is used to prepare elastomer co- and ter-polymers of ethylene, propylene and optionally one or more diene monomers. Generally, such polymers will contain about 50 to about 80 weight % ethylene (preferably about 50 to 60 weight % ethylene) and correspondingly from 50 to 20 weight % of propylene. The elastomers of this invention may also be prepared with a small amount of diene monomer so as to facilitate crosslinking or vulcanization of the elastomer—as is well known to those skilled in the art. The diene is preferably present in amounts up to 10 weight % of the polymer and most preferably is present in amounts from about 3 to 7 weight %. The resulting polymer may have a composition comprising from 40 to 75 weight % of ethylene, from 50 to 15 weight % of propylene and up to 10 weight % of a diene monomer to provide 100 weight % of the polymer. More than one type of diene monomer may be included. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the polymerization reactor. Additional monomers and solvent may be added to the second reactor (if employed) and it may be heated or cooled.

Generally, the catalyst components may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555, issued Dec. 31, 1996).

The residence time in the polymerization reactor will depend on the design and the capacity of the reactor. Generally the reactors should be operated under conditions to achieve a thorough mixing of the reactants. If a dual reactor polymerization process is employed, it is preferred that from 20 to 60 weight % of the final polymer is polymerized in the first reactor, with the balance being polymerized in the second reactor. On leaving the reactor the solvent is removed and the resulting polymer is finished in a conventional manner.

It is also within the scope of this invention to use more than two polymerization reactors.

EXAMPLES

Part A Batch Polymerizations Procedures (EP and EPDM)

The polymerization reactions were performed in a 2 liter reactor ("Parr" reactor). All the chemicals (solvent, monomers, catalyst and scavenger) were fed into the reactor batchwise except ethylene, which was fed on demand. The ethylene flow was controlled using a Hasting mass flow controller set at a maximum rate of 10 slpm (standard liter per minute). The feed streams were purified prior to feeding into the reactor using conventional purification techniques. All reaction components were stored and manipulated under an atmosphere of purified nitrogen or argon. Purified hexane was used as the solvent for the reaction. The reaction was monitored using the Labtech Notebook software. Temperature control was achieved through the use of an automated temperature control system.

Commercially available methylalumoxanes were purchased from Akzo-Nobel (tradenames "PMAO-IP" and "MMAO-7"). A commercially available boron activator, $[CPh_3][B(C_6F_5)_4]$ (or "trityl borate"), was purchased form Asahi Glass Inc. Diene monomer, 5-ethylidene-2-norbornene (ENB) was purchased from Aldrich and distilled over $CaH_2$. Hexene was purchased from Aldrich as HPLC grade and purified by contact with various absorption media.

Polymerizations were investigated at temperatures which are generally relevant to commercial practice. Propylene was added into the reactor as a single increment/batch in an amount of 77 mL for the polymerizations which were completed at 65° C. and 83 mL for those polymerizations which were completed at 80° C. The total reaction pressure was 112 pounds per square inch gauge (psig) for the 65° C. polymerizations and 115 psig for the 80° C. polymerizations. For EPDM polymerizations, the diene monomer (ENB) was added into the reactor as a batch in an amount of 5 mL (except comparative experiment 61628 which used 6.6 mL). 640 mL of hexane was used as solvent. Catalyst concentrations were between 0.5 and 10 micromoles per liter, as indicated in the tables (Ti basis). MAO was used to alkylate the catalysts which were provided in the dichloride form (at Al/Ti ratios of 20/1). This was not required for catalysts in a dimethyl form. Catalysts and activators were dissolved in a small amount of toluene and injected into the reactor under pressure. (The toluene was purchased from Aldrich and purified over molsieves prior to use.) Boron activator was added on an equimolar amount (to the transition metal, Ti) unless otherwise indicated. A bulky hindered phenol namely, 2,6-di-tertiary butyl-4-ethyl phenol, was added in some experiments (as shown in the Tables). Comparative examples (using MAO as the sole activator) were run at Al/Ti ratios of approximately 300/1 unless otherwise indicated. The reaction time was 30 minutes. The reactions were terminated by diluting the reaction gases with argon and cooling the reactor. The polymer solution was collected in a stainless steel bowl and the solvent allowed to evaporate leaving behind the polymer. The polymerization activity was calculated based on the weight of the polymer produced, concentration of catalyst and duration of reaction. The EP copolymers were dried in a vacuum oven for 4 hours at about 40° C.; whereas EPDM samples were treated with the procedure described below.

Before being submitted to analysis, EPDM samples were pretreated to remove the residual ENB. The procedure is as follows:

Triethylene glycol was heated to 100° C. and circulated through a copper coil which was immersed in the water bath to maintain the bath temperature. The polymer was stirred gently during the heating. The processed polymer was cut into several smaller pieces to increase the surface area contact with the bath. The sample was submerged to allow complete immersion in the bath. Typical sample treating time was approximately 90 minutes. The polymer was removed from the bath and immersed in ethanol to remove the water. The bulk volume of ethanol was removed from the polymer by vacuum filtration through a sintered glass Buchner funnel. The vacuum was then isolated, the funnel topped with enough ethanol to cover the polymer and the vacuum reapplied to remove the ethanol. The washing was repeated once more for a total of three washings. The polymer was then dried in a vacuum oven at 40° C. overnight to remove residual traces of ethanol.

Certain EP/EPDM polymer samples were analyzed by high temperature GPC-Viscometry (Waters 150-C) at 140° C. in 1,2,4-trichlorobenzene with a universal calibration.

Certain EP/EPDM polymers were analyzed by proton NMR spectroscopy (Bruck-300-DPS, 90° C. in 1,2,3-trichlorobenzene). The methyl, methylene and methine resonances were used to determine the relative amount of ethylene and propylene. The ENB content of EPDM samples was calculated based on the ENB terminal double bond.

The following catalysts were used:
1. (Cyclopentadienyl)Titanium(tri-tertiary butyl phosphinimine)dichloride or "CpTiNPtBu$_3$Cl$_2$";
2. (Cyclopentadienyl)Titanium(tri-tertiary butyl phosphinimine)dimethyl or "CpTiNPtBu$_3$Me$_2$"; and
3. (Pentafluorophenyl-substituted cyclopentadienyl) Titanium(tri-tertiary butyl phosphinimine)dichloride or "CpC$_6$F$_5$TiNPtBu$_3$Cl$_2$".
4. (Pentamethyl-cyclopentadienyl)Titanium(di-tertiary butyl ketimide)dichloride or "CP*TiNCtBu$_2$Cl$_2$".
5. (Pentamethyl cyclopentadienyl)Titanium(di-tertiary butyl ketimide) dimethyl or "Cp*TiNCtBu$_2$Me$_2$".
6. (dimethyl silyl)(tetramethyl cyclopentadienyl)(tertiary butyl amido)titanium dimethyl or "Me$_2$SiC$_5$Me$_4$(N-t-Bu)TiMe$_2$" or "Constrained Geometry Catalyst".

Polymerization conditions and polymer properties are shown in the accompanying tables.

The following abbreviations are used in the tables.
1. A=activity (grams of polymer per mmole of catalyst per hour)
2. Mw=weight average molecular weight ($\times 10^{-3}$)
3. Mn=number average molecular weight ($\times 10^{-3}$)
4. Pd=polydispersity=Mw/Mn
5. P content=propylene content of polymer (weight %)
6. ENB content=ENB content of polymer (weight %)
7. c=comparative Experiment 1 is comparative (as only MAO was used as the activator). Inventive Experiment 2 shows the surprising increase in activity when a boron activator is used as the activator instead of MAO. Experiments 3 and 4 show that the use of MAO in combination with a boron activator provides a further increase in activity.

A1. Ethylene-Propylene-ENB Polymerizations at 65° C. with Phosphinimine-Cyclopentadienyl Catalysts

| Experiment | Catalyst | Catalyst Concentration (micromolar) | Activator | A | Mn | Mw | Pd | P Content wt % | ENB wt % |
|---|---|---|---|---|---|---|---|---|---|
| 61729 | CpTiNPtBu$_3$Cl$_2$ | 10 | MAO | 33674 | 244.6 | 709.3 | 2.9 | 31.2 | 6.0 |
| 62011 | CpTiNPtBu$_3$Me$_2$ | 1.5 | [CPh$_3$][B(C$_6$F$_5$)$_4$]$^1$ | 127142 | 138 | 318 | 2.31 | 29 | 5.0 |
| 62014 | CpTiNPtBu$_3$Cl$_2$ | 1.0 | [CPh$_3$][B(C$_6$F$_5$)$_4$]$^2$ | 185446 | 160 | 561 | 3.51 | 25 | 11.0 |
| 61983 | CpTiNPtBu$_3$Cl$_2$ | 1.24 | [CPh$_3$][B(C$_6$F$_5$)$_4$]$^3$ | 334846 | 188.8 | 393.2 | 2.08 | 52.1 | 1.1 |
| 61999 | CpC$_6$F$_5$TiNPtBu$_3$Cl$_2$ | 0.50 | [CPh$_3$][B(C$_6$F$_5$)$_4$]$^3$ | 247723 | 108 | 223 | 2.1 | 25 | 4.9 |

[1]MAO as scavenger (at 1 mmole/L)
[2]MAO added Al/Ti = 20/1
[3]With MAO and hindered phenol (Al/OH mole ratio = 3.25/1)

A.2 Ethylene-Propylene Polymerization Using A Phosphinimine-Cyclopentadienyl Catalyst at 65° C.

| Run | Catalyst | Activator | A | Mw | Pd | P Content wt % |
|---|---|---|---|---|---|---|
| 61622-c | CpTiNPtBu$_3$Cl$_2$ | PMAO-IP | 56309.65 | 465 | 2.2 | 36.5 |
| 61628-c | Me$_2$SiC$_5$Me$_4$(N-t-Bu)TiMe$_2$ | [CPh$_3$][B(C$_6$F$_5$)$_4$]$^1$ | 36968.03 | 481 | 2.6 | 69 |
| 61632 | CpTiNPtBu$_3$Me$_2$ | [CPh$_3$][B(C$_6$F$_5$)$_4$]$^1$ | 187755.52 | 144 | 3 | 28.4 |

Note: Catalyst concentration was 5 micromoles per litre for the experiments shown in Table A.2.
[1]MAO as scavenger (at 1 mmole/L)

A.3 Ethylene-Propylene Polymerization Using a Ketimide-Cyclopentadienyl Catalyst at 80° C.

| Run | Catalyst | Activator | A | Mw | Pd | P Content wt % |
|---|---|---|---|---|---|---|
| 61701-c | CP*TiNCtBu$_2$Cl$_2$ | PMAO-IP$^2$ | 4320 | 505.8 | 1.95 | 89 |
| 61967 | Cp*TiNCtBu$_2$Cl$_2$ | [CPh$_3$][B(C$_6$F$_5$)$_4$]$^{2,3}$ | 134289 | 268 | 2.2 | 61 |

[2]MAO added Al/Ti = 20/1
[3]With MAO and hindered phenol (Al/OH mole ratio = 3.25/1)

-continued

A.4 Ethylene-Propylene (ENB) Polymerization Using a Ketimide-Cyclopentadienyl Catalyst at 65° C.

| Run | Catalyst | Activator | A | Mw | Pd | P Content wt % | ENB wt % |
|---|---|---|---|---|---|---|---|
| 62015 | CP*TiNCtBu$_2$Cl$_2$ | [CPh$_3$][B(C$_6$F$_5$)$_4$]$^{2,3}$ | 112823 | 257 | 2.77 | 44 | 4 |
| 62016 | CP*TiNCtBu$_2$Me$_2$ | [CPh$_3$][B(C$_6$F$_5$)$_4$]$^1$ | 35143 | 556 | 4.7 | 54 | 5 |
| 62017 | CP*TiNCtBu$_2$Cl$_2$ | [CPh$_3$][B(C$_6$F$_5$)$_4$]$^2$ | 27475 | 183 | 2.85 | 51 | 5 |

[1]MAO as scavenger (at 1 mmole/L)
[2]MAO added Al/Ti = 20/1
[3]With MAO and hindered phenol (Al/OH mole ratio = 3.25/1)

Part B: Solution Polymerization

The Continuous Solution Polymerization

All the polymerization experiments described below were conducted on a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 71.5 cc internal volume. In each experiment the volumetric feed to the reactor was kept constant and as a consequence so was the reactor residence time.

The catalyst solutions were pumped to the reactor independently and there was no pre-contact between the activator and the catalyst. Because of the low solubility of the catalysts, activator and MAO in cyclohexane, solutions were prepared in purified xylene. The catalyst was activated in-situ (in the polymerization reactor) at the reaction temperature in the presence of the monomers for all experiments except 2-447-2 to 2-447-11 (in which the catalyst and activator were pre-contacted in toluene outside the reactor then added to the reactor under pressure). The polymerizations were carried out in cyclohexane at a pressure of 1500 psi. Ethylene was supplied to the reactor by a calibrated thermal mass flow meter at the rates shown in the Tables and was dissolved in the reaction solvent prior to the polymerization reactor. The propylene was also premixed with the ethylene before entering the polymerization reactor. Under these conditions the monomer conversion is a dependent variable controlled by the catalyst concentration, reaction temperature and catalyst activity, etc.

The internal reactor temperature is monitored by a thermocouple in the polymerization medium and can be controlled at the required set point to +/−0.5° C. Downstream of the reactor the pressure was reduced from the reaction pressure (1500 psi) to atmospheric. The solid polymer was then recovered as a slurry in the condensed solvent and was dried by evaporation before analysis.

The ethylene conversion was determined by a dedicated on line gas chromatograph by reference to propane which was used as an internal standard. The average polymerization rate constant was calculated based on the reactor hold-up time, the catalyst concentration in the reactor and the ethylene conversion and is expressed in l/(mmol*min).

Average polymerization rate $(kp)=(Q/(100-Q))\times(1/[M])\times(1/HUT)$:

where:
Q is the percent ethylene conversion;
[M] is the catalyst (metal) concentration in the reactor expressed in mM; and
HUT is the reactor hold-up time in minutes.

B1 Phosphinimine-Cyclopentadienyl Catalysts for Ethylene Propylene Polymerizations Polymerizations conditions (including flow rates of catalyst, activator, MAO and monomers and polymerization temperatures) shown in Table B-1.

Entries 2-448-1 to 2-448-9 (inclusive) are comparative examples in which only MAO was used as the activator. Activity constants ("Kp" in Table 1) of from 536 to 1336 l/mmol/min were observed. Inventive experiments 2-447-2 to 2-447-11 inclusive show that activities were substantially increased when trityl borate was used as the activator.

Polymer data are shown in Table B1b.

B2 Comparative Example—Ethylene Propylene Polymerization using a "Constrained Geometry Catalyst"—(dimethyl silyl)(tetramethyl cyclopentadienyl)(tertiary butyl amido)titanium dimethyl (or "Me$_2$SiC$_5$Me$_4$(N-t-Bu)TiMe$_2$")

Polymerization conditions are shown in Table B2. Polymerization activities are substantially lower than the polymerization activities of the inventive examples shown in Table B1 above.

Polymer data are shown in Table B2b.

B3 Ethylene Propylene(Diene) Polymerization Using Phosphinimine-Cyclopentadienyl Catalysts Polymerization conditions (including flow rates of ENB) are shown in Table B3. The inventive experiments (using trityl borate activator with MMAO-7) show substantially greater activity than the activity of the comparative experiments (using MAO as the only activator).

It should also be noted that the actual activity figures of the inventive EPDM experiments of this example are much lower than the activity figures of the otherwise similar EP experiments in Example B1. Thus, the data show that the presence of the diene monomer has a substantially deactivating effect at the polymerization temperatures of this example. Accordingly, the lower polymerization temperatures (illustrative in Part A) are preferred.

Polymer data are shown in Table B3b.

B4 Ethylene Propylene (Diene) Polymerizations Using a Ketimide-Cyclopentadienyl Catalyst Polymerization conditions, including ENB flow rates, are shown in Table B4. Polymer data are shown in Table B4b.

The activity of this catalyst system for EPDM polymerizations is good under these conditions but substantially lower than the activity of the phosphinimine catalyst (illustrated in B3).

TABLE B1

Polymerization Data

| Run | Catalyst | Activator | 2$^{nd}$ Cocatalyst | Propylene Flow mL/min | Reactor Conc. MicroM Catalyst | Activator Ratio | 2$^{nd}$ Cocatalyst Ratio | Kp l/mMol/min | Ethylene Conversion Q (%) | Temp °C. | Ethylene Flow g/min |
|---|---|---|---|---|---|---|---|---|---|---|---|
| 2-448-1 | CpTiNP(tBu)$_3$Cl$_2$ | none | MMAO-7 | 2.20 | 4.63 | 0.00 | 80.00 | 980.0 | 91.8 | 140 | 2.20 |
| 2-448-2 | CpTiNP(tBu)$_3$Cl$_2$ | none | MMAO-7 | 24.40 | 3.24 | 0.00 | 80.00 | 1136.0 | 90.7 | 140 | 2.20 |
| 2-448-3 | CpTiNP(tBu)$_3$Cl$_2$ | none | MMAO-7 | 8.60 | 3.24 | 0.00 | 80.00 | 932.0 | 88.9 | 140 | 2.20 |
| 2-448-4 | CpTiNP(tBu)$_3$Cl$_2$ | none | MMAO-7 | 3.30 | 3.24 | 0.00 | 80.00 | 1336.0 | 92.0 | 120 | 1.70 |
| 2-448-5 | CpTiNP(tBu)$_3$Cl$_2$ | none | MMAO-7 | 6.50 | 3.24 | 0.00 | 80.00 | 1001.0 | 89.6 | 120 | 1.70 |
| 2-448-6 | CpTiNP(tBu)$_3$Cl$_2$ | none | MMAO-7 | 9.10 | 3.24 | 0.00 | 80.00 | 924.0 | 88.8 | 120 | 1.70 |
| 2-448-7 | CpTiNP(tBu)$_3$Cl$_2$ | none | MMAO-7 | 2.40 | 4.63 | 0.00 | 80.00 | 771.0 | 90.4 | 100 | 1.20 |
| 2-448-8 | CpTiNP(tBu)$_3$Cl$_2$ | none | MMAO-7 | 4.80 | 5.56 | 0.00 | 80.00 | 687.0 | 91.0 | 100 | 1.20 |
| 2-448-9 | CpTiNP(tBu)$_3$Cl$_2$ | none | MMAO-7 | 7.20 | 5.56 | 0.00 | 80.00 | 536.0 | 88.7 | 100 | 1.20 |
| 2-447-2 | CpTiNP(tBu)$_3$Cl$_2$ | Ph$_3$C B(C$_6$F$_5$)$_4$ | MMAO-7 | 2.20 | 1.11 | 1.00 | 49.94 | 4056.0 | 92.3 | 140 | 2.20 |
| 2-447-3 | CpTiNP(tBu)$_3$Cl$_2$ | Ph$_3$C B(C$_6$F$_5$)$_4$ | MMAO-7 | 4.40 | 1.11 | 1.00 | 49.94 | 3534.2 | 91.2 | 140 | 2.20 |
| 2-447-4 | CpTiNP(tBu)$_3$Cl$_2$ | Ph$_3$C B(C$_6$F$_5$)$_4$ | MMAO-7 | 9.10 | 1.57 | 1.00 | 49.94 | 2445.7 | 91.0 | 140 | 2.20 |
| 2-447-5 | CpTiNP(tBu)$_3$Cl$_2$ | Ph$_3$C B(C$_6$F$_5$)$_4$ | MMAO-7 | 3.40 | 0.81 | 1.00 | 49.94 | 4249.4 | 90.1 | 120 | 1.70 |
| 2-447-6 | CpTiNP(tBu)$_3$Cl$_2$ | Ph$_3$C B(C$_6$F$_5$)$_4$ | MMAO-7 | 6.80 | 1.04 | 1.00 | 49.94 | 3052.6 | 89.4 | 120 | 1.70 |
| 2-447-7 | CpTiNP(tBu)$_3$Cl$_2$ | Ph$_3$C B(C$_6$F$_5$)$_4$ | MMAO-7 | 9.10 | 1.57 | 1.00 | 49.94 | 2395.8 | 90.9 | 120 | 1.70 |
| 2-447-8 | CpTiNP(tBu)$_3$Cl$_2$ | Ph$_3$C B(C$_6$F$_5$)$_4$ | MMAO-7 | 2.40 | 1.16 | 1.00 | 49.94 | 3317.9 | 91.1 | 100 | 1.20 |
| 2-447-9 | CpTiNP(tBu)$_3$Cl$_2$ | Ph$_3$C B(C$_6$F$_5$)$_4$ | MMAO-7 | 4.80 | 1.11 | 1.00 | 49.94 | 3325.0 | 90.7 | 100 | 1.20 |
| 2-447-10 | CpTiNP(tBu)$_3$Cl$_2$ | Ph$_3$C B(C$_6$F$_5$)$_4$ | MMAO-7 | 7.20 | 1.57 | 1.00 | 49.94 | 2580.8 | 91.5 | 100 | 1.20 |
| 2-447-11 | CpTiNP(tBu)$_3$Cl$_2$ | Ph$_3$C B(C$_6$F$_5$)$_4$ | MMAO-7 | 4.40 | 1.11 | 1.00 | 49.94 | 3405.9 | 90.9 | 140 | 2.20 |

TABLE B1b

Polymer Data

| Run | Wt % C3 | Mn | Mw | Pd |
|---|---|---|---|---|
| 2-448-1 | | | | |
| 2-448-2 | | | | |
| 2-448-3 | 32.2 | 86 | 180 | 2.1 |
| 2-448-4 | | | | |
| 2-448-5 | | | | |
| 2-448-6 | 34.0 | 115 | 232 | 2.0 |
| 2-448-7 | 27.8 | 198 | 386 | 1.9 |
| 2-448-8 | 34.8 | 171 | 316 | 1.8 |
| 2-448-9 | 41.7 | 164 | 289 | 1.8 |
| 2-447-2 | | | | |
| 2-447-3 | | | | |
| 2-447-4 | 29.9 | 55 | 104 | 2.0 |
| 2-447-5 | | | | |
| 2-447-6 | | | | |
| 2-447-7 | 34.6 | 87 | 156 | 1.8 |
| 2-447-8 | 16.7 | 193 | 334 | 1.7 |
| 2-447-9 | 30.9 | 149 | 258 | 1.7 |
| 2-447-10 | 43.9 | 136 | 241 | 1.8 |
| 2-447-11 | | | | |

TABLE B2

Polymerization Data

| Run | Catalyst | Activator | 2$^{nd}$ Co-catalyst | Propylene Flow mL/min | Reactor Conc. MicroM Catalyst | Activator Ratio | 2$^{nd}$ Cocatalyst Ratio | Kp l/mMol/min | Ethylene Conversion Q (%) | Temp °C. | Ethylene Flow g/min |
|---|---|---|---|---|---|---|---|---|---|---|---|
| 2-449-1 | Me$_2$SiC$_5$Me$_4$(N-t-Bu)TiMe$_2$ | B(C$_6$F$_5$)$_3$ | none | 2.20 | 11.11 | 2.00 | 0.00 | 354.4 | 91.3 | 140 | 2.20 |
| 2-449-2 | Me$_2$SiC$_5$Me$_4$(N-t-Bu)TiMe$_2$ | B(C$_6$F$_5$)$_3$ | none | 4.70 | 11.11 | 2.00 | 0.00 | 303.5 | 89.9 | 140 | 2.20 |
| 2-449-4 | Me$_2$SiC$_5$Me$_4$(N-t-Bu)TiMe$_2$ | B(C$_6$F$_5$)$_3$ | none | 3.50 | 13.89 | 2.00 | 0.00 | 305.2 | 91.8 | 120 | 1.70 |
| 2-449-5 | Me$_2$SiC$_5$Me$_4$(N-t-Bu)TiMe$_2$ | B(C$_6$F$_5$)$_3$ | none | 6.70 | 13.89 | 2.00 | 0.00 | 206.8 | 88.4 | 120 | 1.70 |
| 2-449-6 | Me$_2$SiC$_5$Me$_4$(N-t-Bu)TiMe$_2$ | B(C$_6$F$_5$)$_3$ | none | 1.70 | 13.89 | 2.00 | 0.00 | 325.0 | 92.3 | 120 | 1.70 |
| 2-449-7 | Me$_2$SiC$_5$Me$_4$(N-t-Bu)TiMe$_2$ | B(C$_6$F$_5$)$_3$ | none | 1.20 | 13.89 | 2.00 | 0.00 | 280.4 | 91.2 | 100 | 1.20 |
| 2-449-8 | Me$_2$SiC$_5$Me$_4$(N-t-Bu)TiMe$_2$ | B(C$_6$F$_5$)$_3$ | none | 2.40 | 13.89 | 2.00 | 0.00 | 295.7 | 91.6 | 100 | 1.20 |
| 2-449-9 | Me$_2$SiC$_5$Me$_4$(N-t-Bu)TiMe$_2$ | B(C$_6$F$_5$)$_3$ | none | 4.80 | 13.89 | 2.00 | 0.00 | 244.7 | 90.0 | 100 | 1.20 |

TABLE B2b

| Run | Wt % C3 | Mn | Mw | Pd |
|---|---|---|---|---|
| 2-449-1 | 20.4 | 20 | 48 | 2.4 |
| 2-449-2 | 46.8 | 13 | 31 | 2.3 |
| 2-449-4 | 54.5 | 14 | 33 | 2.4 |
| 2-449-5 | 62.4 | 14 | 28 | 2.0 |
| 2-449-6 | 37.4 | 16 | 39 | 2.5 |
| 2-449-7 | 33.1 | 25 | 66 | 2.6 |
| 2-449-8 | 48.9 | 17 | 52 | 3.0 |
| 2-449-9 | 66.1 | 18 | 49 | 2.7 |

TABLE B3

Polymerization Data

| Run | Catalyst | Activator | 2nd Co-catalyst | Propylene Flow mL/min | Reactor Conc. MicroM Catalyst | Activator Ratio | 2nd Cocatalyst Ratio | Kp l/mMol/min | Ethylene Conversion Q (%) | Temp °C. | Ethylene Flow g/min | ENB Ml/min |
|---|---|---|---|---|---|---|---|---|---|---|---|---|
| 2-483-1 | CpTiNP(tBu)$_3$Cl$_2$-c | none | MMAO-7 | 8.80 | 8.33 | 0.00 | 80.00 | 250.9 | 84.7 | 140 | 2.2 | 0.50 |
| 2-483-2 | CpTiNP(tBu)$_3$Cl$_2$-c | none | MMAO-7 | 4.80 | 10.19 | 0.00 | 80.00 | 144.9 | 79.6 | 100 | 1.2 | 0.27 |
| 2-483-3 | CpTiNP(tBu)$_3$Cl$_2$ | Ph$_3$C B(C$_6$F$_5$)$_4$ | M.MAO-7 | 8.80 | 2.31 | 1.00 | 50.00 | 614.4 | 79.0 | 140 | 2.2 | 0.50 |
| 2-483-5 | CpTiNP(tBu)$_3$Cl$_2$ | Ph$_3$C B(C$_6$F$_5$)$_4$ | MMAO-7 | 4.8Q | 2.31 | 1.00 | 50.00 | 708.3 | 81.3 | 100 | 1.2 | 0.27 |

TABLE B3b

Polymer Data

| Run | Wt % C3 | Wt % ENB | Mn | Mw |
|---|---|---|---|---|
| 2-483-1 | 28.4 | 5.0 | 85 | 157 |
| 2-483-2 | 24.5 | 6.5 | 183 | 364 |
| 2-483-3 | 26.9 | 5.7 | 69 | 164 |
| 2-483-5 | 31.0 | 6.0 | 189 | 377 |

TABLE B4

Polymerization Data

| Run | Catalyst | Activator | 2nd Co-catalyst | Propylene Flow mL/min | Reactor Conc. MicroM Catalyst | Activator Ratio | 2nd Cocatalyst Ratio | Kp l/mMol/min | Ethylene Conversion Q (%) | Temp °C. | Ethylene Flow g/min | ENB Ml/min |
|---|---|---|---|---|---|---|---|---|---|---|---|---|
| 2-484-1 | Cp*TiNC(tBu)$_2$Me$_2$ | Ph$_3$C B(C$_6$F$_5$)$_4$ | none | 2.40 | 18.52 | 1.00 | 0.00 | 348.4 | 94.5 | 100 | 1.2 | 0 |
| 2-484-2 | Cp*TiNC(tBu)$_2$Me$_2$ | Ph$_3$C B(C$_6$F$_5$)$_4$ | none | 2.40 | 18.52 | 1.00 | 0.00 | 240.4 | 92.2 | 100 | 1.2 | 0.27 |
| 2-484-3 | Cp*TiNC(tBu)$_2$Me$_2$ | Ph$_3$C B(C$_6$F$_5$)$_4$ | none | 2.40 | 9.26 | 1.00 | 0.00 | 353.6 | 89.7 | 100 | 1.2 | 0.13 |

TABLE B4b

| Run | Wt % C3 | Wt % ENB | Mn | Mw |
|---|---|---|---|---|
| 2-484-1 | 42.4 | 0.0 | 50 | 116 |
| 2-484-2 | 39.6 | 5.9 | 73 | 169 |
| 2-484-3 | 29.8 | 1.9 | 78 | 166 |

What is claimed is:

1. A process for the preparation of an elastomeric ethylene-propylene polymer wherein said process is characterized by being undertaken under solution polymerization conditions in the presence of a catalyst system which comprises:

1) an unbridged catalyst having a single cyclopentadienyl ligand and a monosubstituted monoanionic nitrogen ligand; and 2) a boron activator;

wherein said catalyst is defined by the formula:

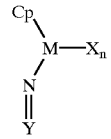

wherein Y is selected from the group consisting of:
ai) a phosphorus substituent defined by the formula:

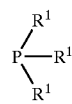

wherein each $R^1$ is independently selected from the group consisting of a hydrogen atom, a halogen atom, $C_{1-20}$ hydrocarbyl radicals-which are unsubstituted by or further substituted by a halogen atom, a $C_{1-8}$ alkoxy radical, a $C_{6-10}$ aryl or aryloxy radical, an amido radical, a silyl radical of the formula:

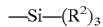
—Si—$(R^2)_3$ wherein each $R^2$ is independently selected from the group consisting of hydrogen, a $C_{1-8}$ alkyl or alkoxy radical, $C_{6-10}$ aryl or aryloxy radicals, and a germanyl radical of the formula:

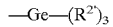
—Ge—$(R^{2'})_3$ wherein $R^{2'}$ is independently selected from the group consisting of hydrogen, a $C_{1-8}$ alkyl or alkoxy radical, $C_{6-10}$ aryl or aryloxy radicals, and a germanyl radical; and aii) a substituent defined by the formula:

wherein each of $Sub^1$ and $Sub^2$ is independently selected from the group consisting of hydrocarbyls having from 1 to 20 carbon atoms; silyl groups, amido groups and phosphido groups;

Cp is a ligand selected from the group consisting of cyclopentadienyl, substituted cyclopentadienyl, indenyl, substituted indenyl, fluorenyl and substituted fluorenyl;

X is an activatable ligand and n is 1 or 2 depending upon the valence of M and the valence of X; and M is a group 4 metal selected from the group consisting of titanium, hafnium and zirconium.

2. The process according to claim 1 wherein said elastomeric ethylene propylene copolymer is characterized by having a weight average molecular weight of at least 60,000 and a propylene content of at least 20 weight %.

3. The process according to claim 1 wherein M is titanium; n is 2 and each activatable ligand is selected from the group consisting of chlorine and methyl; and the ligand —N═X is a phosphinimine ligand defined by the formula:

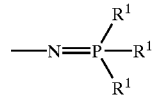

wherein each $R^1$ wherein is a $C_{1-20}$ hydrocarbyl radical.

4. The process according to claim 3 wherein each $R^1$ is a tertiary butyl.

5. The process according to claim 1 wherein said boron activator is characterized by being four perfluorinated phenyl ligands bounded to said boron.

6. The process according to claim 5 which is further characterized by the presence of an alumoxane, with the proviso that the mole ratio of boron to transition metal M is from 0.5/1 to 3/1.

7. The process according to claim 6 wherein said aluminoxane contains aluminum in an amount so as to provide an aluminum to transition metal M mole ratio of from 2/1 to 100/1.

8. The process according to claim 1 wherein said polymerization conditions comprise a temperature of from 10° C. to 150° C.

9. The process according to claim 1 wherein said polymerization conditions comprise a temperature of from 10° C. to 150° C.

10. The process according to claim 8 wherein said polymerization temperature is less than 100° C.

11. The process according to claim 9 wherein said polymerization temperature is less than 100° C.

* * * * *